United States Patent [19]

Shah et al.

[11] Patent Number: 4,716,328

[45] Date of Patent: Dec. 29, 1987

[54] MAGNETIC FIELD COMPENSATED LIQUID METAL CURRENT COLLECTOR FOR ACYCLIC GENERATOR

[75] Inventors: Manoj R. Shah, Latham; Henry G. Lenz, William L. Bird, Jr. both of Scotia, all of N.Y.

[73] Assignee: General Electric Company, Pittsfield, Mass.

[21] Appl. No.: 815,611

[22] Filed: Jan. 2, 1986

[51] Int. Cl.$^4$ ............................................. H02K 31/00
[52] U.S. Cl. .................................... 310/178; 310/219
[58] Field of Search ............ 310/178, 219, 232, 75 R, 310/168, 102 R, 102 A; 318/153; 322/48

[56] References Cited

U.S. PATENT DOCUMENTS

| | | | |
|---|---|---|---|
| 3,736,450 | 5/1973 | Emaldi | 310/178 |
| 4,168,446 | 9/1979 | Hatch | 310/219 |
| 4,241,272 | 12/1980 | Marshall | 310/219 |
| 4,266,154 | 5/1981 | Marshall | 310/219 |
| 4,275,323 | 6/1981 | Hatch | 310/178 |
| 4,385,251 | 5/1983 | Millick | 310/178 |
| 4,399,381 | 8/1983 | Chabrerie | 310/178 |
| 4,581,551 | 4/1986 | Kuznetsov | 310/178 |
| 4,602,179 | 7/1986 | Kuzetsov | 310/178 |

FOREIGN PATENT DOCUMENTS

| | | | |
|---|---|---|---|
| 0249217 | 9/1962 | Australia | 310/178 |
| 0155571 | 12/1980 | Japan | 310/178 |
| 2107937 | 5/1973 | United Kingdom | 310/178 |
| 0828333 | 5/1981 | U.S.S.R. | 310/178 |
| 1019545 | 5/1983 | U.S.S.R. | 310/178 |

Primary Examiner—R. Skudy
Attorney, Agent, or Firm—Bailin L. Kuch; Robert A. Cahill

[57] ABSTRACT

Active compensation in the form of a pair of trim coils and passive compensation in the form of a solenoidal-shaped magnetic shunt are disclosed for shaping the magnetic field existing in the liquid metal current collector region of an acyclic generator such as to minimize the field component normal to the stator and rotor collector surfaces and thereby substantially eliminate the generation of circulating currents in the liquid metal medium.

2 Claims, 2 Drawing Figures

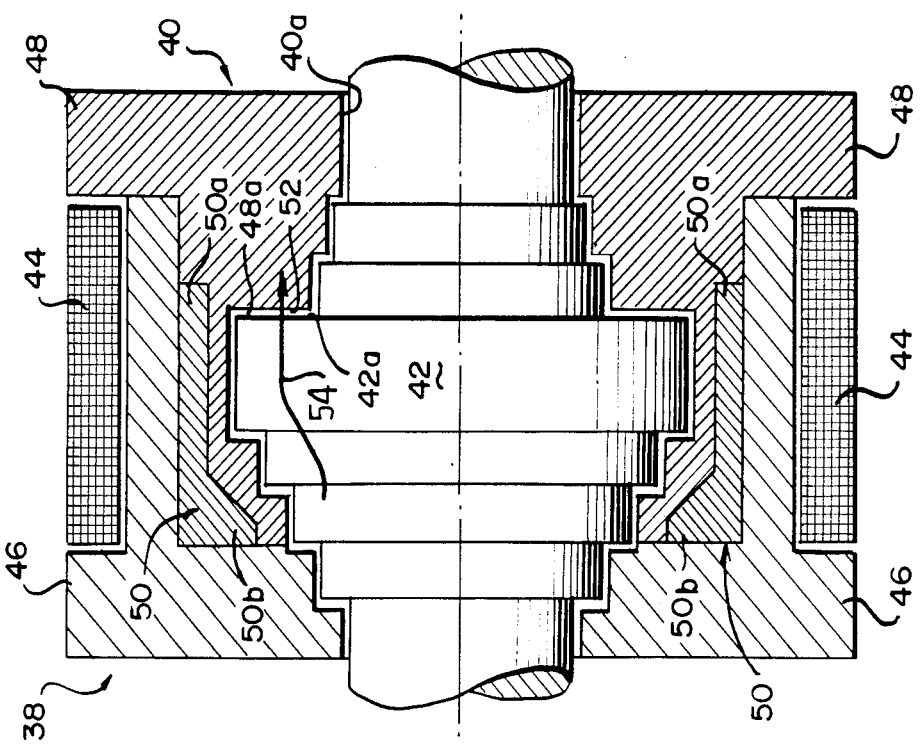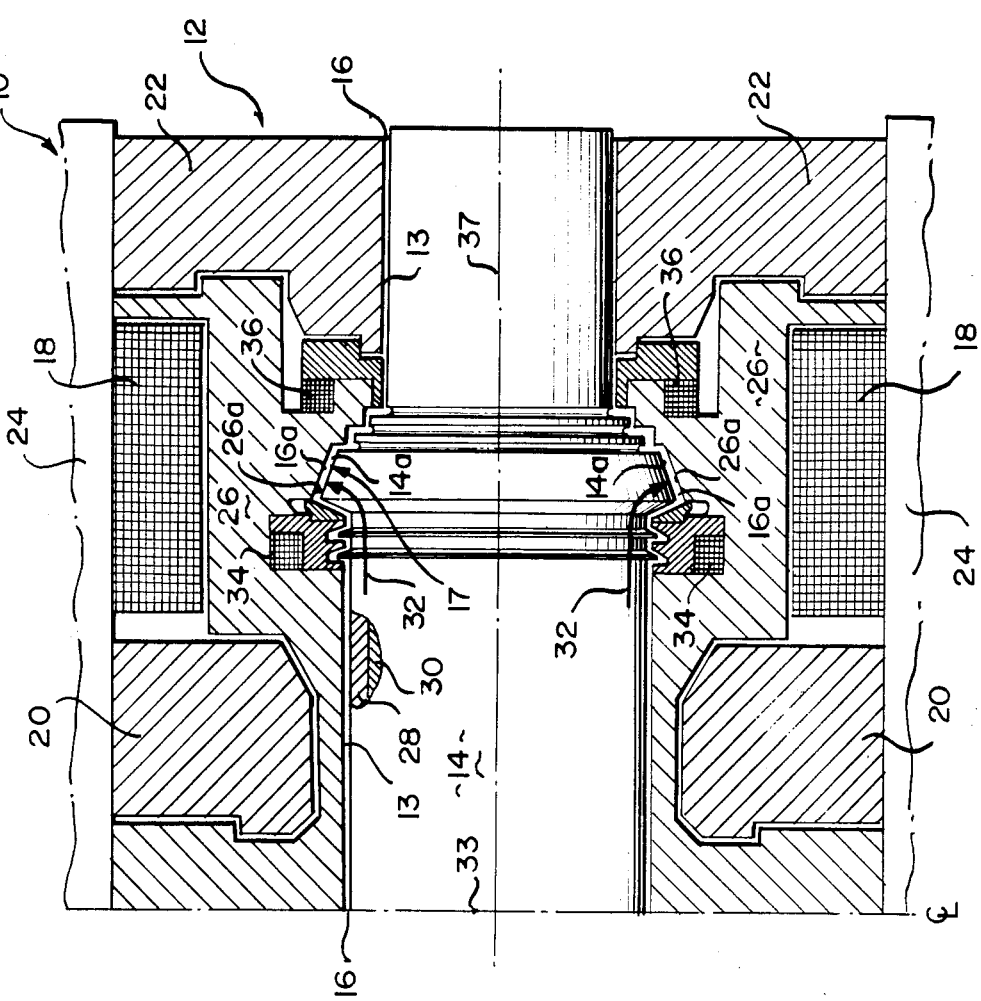

MAGNETIC FIELD COMPENSATED LIQUID METAL CURRENT COLLECTOR FOR ACYCLIC GENERATOR

BACKGROUND OF THE INVENTION

The present invention relates to dynamoelectric machines and particularly to acyclic (homopolar) generators utilizing liquid metal current collectors.

In acyclic (homopolar) generators the interaction of the component of the magnetic field normal to the plane of the current collectors, i.e., aligned with the path of current between stator and rotor, and the rotor peripheral velocity establishes a voltage which develops circulating currents in both solid brush and liquid metal current collectors. These circulating currents produce additional electrical losses in the generator under load conditions by creating a non-uniform current distribution at the collector. Circulating currents also increase open circuit or no load losses by virtue of the resistive losses in the collector tip and brushgear. Such open circuit losses are proportinal to the square of both the flux density of the normal magnetic field component and the collector tip velocity. In the case of liquid metal collectors, the additional resistive losses imposed by circulating currents raise the temperature of the liquid metal, and thus its flow rate must be increased to limit this temperature rise to acceptable levels. Excessive liquid metal temperatures raises its electrical resistivity and alters its mass density from that to which the structure for containing the liquid metal in the collector region against electromagnetic expulsion forces is designed.

A goal of present research and development efforts is to develop smaller, ultra-high current acyclic genrators of dramatically increased power density. Increases in the magnetic flux density and/or peripheral velocity of the acyclic machinery are required to develop the necessary generator voltages. Liquid cooled copper armatures and compensating conductors are required to carry the ultra-high currents. This results in larger air gaps between the stator and rotor. The combination of increased flux densities and air gap length increases the magnitude of the fringing or leakage fields in the liquid metal collector region. All of these factors contribute to high power densities, as well as to increased circulating currents and associated electrical losses in the liquid metal collector region of acyclic generators.

It is accordingly an object of the present invention to provide an acyclic generator having an improved liquid metal current collector.

A further object is to provide an acyclic generator wherein the magnetic field in the region of the liquid metal current collectors is shaped to reduce the magnitudes of circulating currents.

A further object of the present invention is to provide an acyclic generator of the above-character wherein the components of the excitation magnetic field in the liquid metal current collector region are reduced.

Another object is to provide an acyclic generator of the above-character wherein the magnetic field component normal to the plane of the liquid metal collector is minimized.

Other objects of the invention will in part be obvious and in part appear hereinafter.

SUMMARY OF THE INVENTION

In accordance with the present invention there is provided an acyclic or homopolar generator having an improved liquid metal current collector wherein the generation of circulating currents in the liquid metal medium is minimized. To this end, the generator includes magnetic compensating means for limiting the existence in the collector region of at least that component of the main or excitation magnetic field which is aligned with the direction of the main generator current. In one embodiment of the invention, a pair of solenoidal trim coils are incorporated in the stator in continuous flanking relation to the annular stator collector surface. These trim coils are energized to develop magnetic fields effective not only in reducing the leakage flux of the exciting field in the collector region, but also in substantially cancelling the component thereof which is normal to the stator collector surface, i.e., parallel to the collector current path. Preferably, these trim coils are energized with respectively equal and opposite direct currents such that their net magnetic field contribution to the main exciting field is practically zero.

In an alternative embodiment of the invention, the leakage field distribution in the collector region is appropriately shaped by the inclusion in the stator adjacent its collector surface of an annular compensating shunt of magnetically permeable material effective in shunting a significant portion of the leakage flux away from the collector region. In addition, the shunt is so positioned and shaped to both minimize the leakage field component normal to the stator collector surface and not to interfer with the main or load current path beyond the stator collector surface. In both embodiments of the invention, it is found that optimized compensation directed to the virtual elimination of circulating current generation can be achieved by utilization of either the trim coils or the magnetic shunt in combination with a spatial orientation of the stator collector surface and of course the complimenting rotor collector surface calculated to practically eliminate the magnetic field component normal thereto.

The invention accordingly comprises the features of construction., combinations of elements and arrangements of parts which will be exemplified in the constructions hereinafter set forth, and the scope of the invention will be indicated in the claims.

For a fuller understanding of the nature and objects of the invention, reference should be had to the following detailed description taken in conjunction with the accompanying drawings, in which:

FIG. 1 is a fragmentary side elevational view, partially in section, of an acyclic generator constructed in accordance with one embodiment of the invention; and FIG. 2 is a fragmentary side elevational view, partially in section of an acyclic generator constructed in accordance with an alternative embodiment of the invention.

DETAIL DESCRIPTION

Refering to FIG. 1, an acyclic or homopolar genreator, generally indicated at 10, includes a stator, generally indicated at 12, having a bore 13 for accommodating a rotor 14 journalled for rotation by suitable bearings (not shown). The rotor and stator are separated by a clearance or air gap 16. Incorporated in stator 12 is a solenoidal-shaped main field winding 18 which is flanked on the left by an annular main polepiece 20 and on the right by an annular return polepiece 22. Coupling these polepieces in magnetic circuit is a cylindrical back iron member or yoke 24. Current energization of winding 18 establishes a main excitation field with flux established along paths including the pole pieces 20 and 22, yoke 24, and the portion of rotor 14 between these pole pieces.

To handle the high direct currents generated by the coaction of this main excitation field and the high velocity rotation of rotor 14, stator 12 incorporates an annular terminal member 26 of highly conductive metal such as copper. A segment of the inner diameter of this terminal member is machined to provide a annular, conical-shaped stator collector surface 26a which cooperates with a complimenting conical rotor collector surface 14a to define, as a segment of air gap 16, a collector gap 16a therebetween. To provide electrical connection between these conical collector surfaces, an electrically conductive liquid metal, such as a sodium-potassium eutectic (NaK), is conveyed by suitable means (not shown) to fill annular collector gap 16a. The stator collector surface 26a, rotor collector surface 14a and the liquid metal in the collector gap 16a constitute one of the generator current collectors 17 which is in radially underlying relation with the main field winding 18. As in conventional practice, complimenting annular grooves, shoulders and land surfaces formed in the stator bore and on the rotor periphery to each side of stator-rotor collector surfaces serve to maintain the collector gap filled with liquid metal.

Except for the stator-rotor collector surfaces, the stator and rotor surfaces defining gap 16, particularly that portion of the stator bore 13 formed by terminal member 26, are coated with a suitable insulating material such as alumina. Thus, current transport between the stator and rotor is limited to a well defined collector region constituted by the stator collector surface 26a, the rotor collector surface 14a, and the liquid metal in gap 16a. To provide a high conductivity current path through the rotor, it is provided with an outer metallic sleeve 28, preferably of copper, surrounding a core 30 of magnetic steel. The main current path in rotor 14 leading to the collector region is indicated by arrows 32.

It will be appreciated that the above-described generator structure, as well as the structure described below, is replicated in mirror image to the left of centerline 33. In other words, the construction seen in FIG. 1 is symetrical about this centerline.

With continued reference to FIG. 1, to minimize the generation of circulating currents in the liquid metal filled gap 16a, a pair of axially spaced solenoidal-shaped trim coils 34 and 36 are incorporated in stator 12 in flanking relation to the collector region. These trim coils are energized to develop magnetic fields effective in cancelling at least a portion of the excitation leakage flux existing in the collector region. More importantly, the trim coil fields are of a character to practically eliminate the component of the leakage field which is normal to the planes of the stator and rotor collector surfaces, i.e., parallel to the current path through gap 16a. Since it is this field component that is responsible for the generation of circulating currents in the liquid metal occupying this gap, its virtual elmination avoids the losses and thermal problems associated with such circulating currents. In other words, the trim coil fields in effect shape or compsnate the leakage field existing in the collector region to achieve a substantial alignment of the leakage flux lines with the collector surface plane. Consequently, flux lines do not penetrate these collector surfaces to set up circulating currents in the liquid metal collector medium. Thus, the length of collector gap 16a may be expanded for increased current carrying capacity without the penalties of increased losses and undue resistance heating of the liquid metal. Preferably, the trim coils are energized with equal and opposite direct currents such that the net magnetic field contribution to the main exciting field is practically zero.

The exact stator positions of trim coils 34 and 36 and their level of current excitation to achieve the desired field compensation depends on the magnetic circuit design of the acyclic generator and the expected generator loading. In applications where generator loading varies widely, e.g., no load to full load, a program can be readily developed utilizing active feedback control to vary trim coil excitation in accordance with load current magnitude. Other factors to be considered in establishing the trim coil positions is the avoidance of interference with the main current path through terminal member 26 and the problems of producibility. Also to be factored in is the requisited magnetomotive force the trim coils must develop to achieve the desired field compensation. If high current excitation is required, trim coil size must be increased, and this can create space availability problems. The positions of trim coils 34 and 36 relative to the collector region and to each other seen in FIG. 1 illustrate that trading off amongst the above-noted considerations may result in their positions being radially offset and collector gap 16a being of a conically shape, i.e., angled relative to generator axis 37, rather than axially aligned (cylindrically shaped), in order to achieve neutralization of the field component normal to the collector surfaces.

The embodiment of FIG. 2 illustrates a passive compensation approach to minimizing the generation of circulating currents in the liquid metal current collector medium, in contrast to the "active" compensation approach of FIG. 1; active in the sense that the magnitude of current excitation of trim coils 34 and 36 may be adjusted to achieve the requisite field compensation over the full range of load currents. As seen in FIG. 2, an acyclic genrator, generally indicated at 38, includes a stator, generally indicated at 40, having stepped bore 40a, accommodating a rotor 42. Incorporated in the stator is a main field winding 44, a main pole 46, and a current terminal member 48, all of a solenoidal shape. For the sake of simplicity, the return pole and yoke or back iron member have been omitted from FIG. 2.

Also incorporated in the stator 40 is a solenoidal shaped field compensating or magnetic shunt member, generally indicated at 50, which is formed of magnetic steel. While the dimensions and cross section of member 50, as well as its position in the stator, depend on the considerations recited above in connection with FIG. 1, for purposes of the instant disclosure it is illustrated as having a cylindrical segment 50a with a triangular segment 50b at one end. The high magnetic permeability of member 50 is effective in shunting a large percentage of the main excitation leakage field away from the current collector region. It has been determined that the illustrated position and shape of member 50 is effective in practically eliminating the axial component of leakage field in the current collector region, which means that, to avoid circulating current generation, the stator and rotor collector surfaces should be radially oriented. Thus, as seen in FIG. 2, the radial surface 48a of terminal member 48 is utilized as the stator current collector surface and radial surface 42a of rotor 42 is utilized as the rotor collector surface. These opposed, radial collector surfaces define a collector gap 52 which is filled with a suitable liquid metal, such as NaK. Thus, this gap is essentially aligned with the leakage field existing in the current collector region, and consequently there is virtually no field component aligned with the main current path through the collector region; this path being indicated by arrow 54. It will be understood that, except for the stator and rotor collector surfaces, the opposed stator and rotor surfaces are insulatively coated with alumina so as to limit current transport between the stator and rotor to the collector region. It is seen that the position of compensating, magnetic shunt member 50 is such as to not interfer with the main current path through terminal member 48 and is sufficiently removed therefrom so as not to become magnetically saturated and thus loose its field compensating effectiveness under heavy generator loading.

It is thus seen that the objects set forth above, including those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described the invention, what is claimed as new and desired to secure by Letter Patent is:

1. An acyclic dynamoelectric machine comprising, in combination:
   A. a stator having a bore;
   B. a rotor mounted for rotation about its axis within said bore and separated from said stator by an annular air gap;
   C. a pair of axially spaced, solenoidal-shaped field windings for developing an excitation magnetic field;
   D. a pair of current collectors, each said current collector being in radially underlying relation with a different one of said field windings and including opposed, conforming annular collector surfaces of said rotor and said stator separated by a segment of said air gap and liquid metal disposed within said air gap segment to conduct current between said stator and said rotor collector surfaces, said rotor and stator collector surfaces being disposed at a predetermined angle relative to said axis; and
   E. solenoidal-shaped compensation means incorporated in said stator for shaping said excitation magnetic field in the regions of said current collectors such as to minimize field components thereof normal to said stator and rotor collector surfaces, said compensation means including a separate pair of axially spaced trim coils associated with each said current collector, said trim coils of each said trim coil pair disposed in opposed, continuous flanking relation with said stator collector surface of the associated one of said current collectors and respectively energized with equal and opposite direct currents, whereby the net magnetic field contribution of said trim coils to said excitation field is practically zero.

2. The acyclic dynamoelectric machine defined in claim 1, wherein said stator and rotor collector surfaces are of conical configurations.

* * * * *